United States Patent
Price et al.

(10) Patent No.: US 6,519,109 B1
(45) Date of Patent: Feb. 11, 2003

(54) METHOD AND APPARATUS FOR PROVIDING FEEDFORWARD CONTROL OF TWO INTERACTING ACTUATORS

(75) Inventors: Kirk Barrows Price, San Jose, CA (US); Louis Joseph Serrano, San Jose, CA (US); Mantle Man-Hon Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 09/620,789

(22) Filed: Jul. 21, 2000

(51) Int. Cl.$^7$ .............................................. G11B 5/596
(52) U.S. Cl. ................... 360/78.09; 360/78.12
(58) Field of Search ................. 360/69, 75, 78.09, 360/78.12, 78.05; 318/560

(56) References Cited

U.S. PATENT DOCUMENTS

| | | | |
|---|---|---|---|
| 4,796,112 A | * 1/1989 | Mizukami et al. | 360/75 |
| 4,843,503 A | 6/1989 | Hazebrouck et al. | |
| 4,967,293 A | * 10/1990 | Aruga et al. | 360/246.7 |
| 5,523,901 A | 6/1996 | Anderson et al. | |
| 5,761,007 A | 6/1998 | Price et al. | |
| 5,805,386 A | 9/1998 | Faris | |
| 6,005,743 A | * 12/1999 | Price et al. | 360/75 |
| 6,121,742 A | * 9/2000 | Misso | 318/562 |

FOREIGN PATENT DOCUMENTS

| | | |
|---|---|---|
| JP | 03263659 A | 11/1991 |
| WO | WO 99/08268 | 2/1999 |
| WO | WO 99/08269 | 2/1999 |

OTHER PUBLICATIONS

"Combination of Rotary and Linear Actuators," IBM Technical Disclosure Bulletin, Mar. 1984, pp. 5393–5394.
"Method to Reduce Track Misregistration on Dual Actuator Dasd," IBM Technical Disclosure Bulletin, Dec. 1984, pp. 3920–3921.
"Adaptive Seek Control of a Disk Drive," IBM Technical Disclosure Bulletin, Jun. 1993, pp. 187–188.
Chen et al., "Adaptive Base Casting Dynamics Estimator With Compensation for Base Casting Motion in Direct–Access Storage Devices," IBM Technical Disclosure Bulletin, vol. 39, No. 7, pp. 179–186.

* cited by examiner

Primary Examiner—David Hudspeth
Assistant Examiner—K. Wong
(74) Attorney, Agent, or Firm—Altera Law Group, LLC

(57) ABSTRACT

A method and apparatus for providing feedforward control of two interacting actuators to compensate for interaction there between is disclosed. State models for each actuator that processes acceleration for each actuator provide an estimate of head acceleration for each of the actuators and to provide feedforward control signals to the actuators for controlling the positioning of the heads based upon the estimates of head acceleration for each of the actuators.

16 Claims, 7 Drawing Sheets

METHOD AND APPARATUS FOR PROVIDING FEEDFORWARD CONTROL OF TWO INTERACTING ACTUATORS

BACKGROUND OF THE INVENTION

1. Field of the Invention

This invention relates in general to a mass storage systems for computer systems, and more particularly to a method and apparatus for providing feedforward control of two interacting actuators to compensate for interaction there between.

2. Description of Related Art

Fixed magnetic disk systems, typically referred to as "hard" disk drives, are now commonplace as the main non-volatile storage in modern personal computers, workstations, and portable computers. Such hard disk drives are now capable of storing gigabyte quantities of digital data, even when implemented in portable computers of the so-called "notebook" class. Many important advances have been made in recent years that have enabled higher data density and thus larger storage capacities of hard disk drives, and that have also enabled much faster access speeds, both in the bandwidth of data communicated to and from the hard disk drive, and also in the access time of specified disk sectors. Advances have also been made that have greatly reduced the size and weight of hard disk drives, particularly as applied to portable computers, have been made over recent years. These advances have resulted in the widespread availability of ultra-light portable computers, yet having state-of-the art capability and performance.

A head/disk assembly typically comprises one or more commonly driven magnetic disks rotatable about a common spindle and cooperating with at least one head actuator for moving a plurality of heads radially relative to the disks so as to provide for the reading and/or writing of data on selected circular tracks provided on the disks. As track pitch decreases, servo performance will decrease because of the more stringent tracking criteria unless a break is made with current disk drive design. One proposal has been to put two independently controlled actuators on one disk drive. Servo performance is then increased because one actuator can seek to a new location while the second actuator is accessing data. In this way the seek and settle time is hidden from the user: he sees instead only the final portion of the seek that occurs when the data access on the other actuator has completed.

In some disk drives, a plurality of head actuators are employed. For example, in one type of disk drive, head actuators are located at different circumferential positions relative to the disks. Other types of disk drives provide a combination of rotary and linear actuators. Still other disk drives use a plurality of head actuators, wherein at least a first actuator position a first set of transducers relative to a first group of rotating disks and at least a second actuator position a second set of transducers relative to a second group of rotating disks. However, in all cases, to obtain greater system flexibility, it is advantageous to provide for each head actuator to be separately controllable so that its respective heads can be moved to a desired track irrespective of the track position provided by any other head actuator for its respective heads.

A primary function of a disc drive actuator and its accompanying servo control system is to keep the read/write heads on track. However, the primary difficulty with multiple, independent head actuators is that the act of seeking by one actuator adversely affects the positioning of the second actuator. If severe enough, this interaction can cause data errors on the actuator that is accessing data. Less severe but still undesirable is the loss of performance because of soft errors. Mechanical resonances within the actuator limit the precision of the tracking system and adversely affect the time required for the heads to settle after a seek. Many actuators, and most notably rotary actuators, have relatively long and flexible head arms. Such elongated head arms tend to have separate modes of vibration which are easily excited during normal operation of the disc drive. When such vibrations go undamped or are only lightly damped, they limit the overall performance of the disc drive.

In the past, such control problems were typically overcome by limiting the bandwidth of the control system to movements that are not likely to excite such resonances. However, when relatively elongated head arms are used and as track pitch decreases, merely limiting the performance of the control system will have an adverse effect on the overall drive performance.

For example, a plurality of separately controllable head actuators may be mounted on a common (or mechanically interconnected) base structure. Thus, the driving of one head actuator will cause at least some portion of the mechanical driving forces to be coupled to other head actuators via the common base structure. A head/disk assembly and its associated servo control are typically constructed and arranged so that coupling forces produced as a result of driving a head actuator have a minimal effect on the operation of any other head actuator.

Nevertheless, because of the demand for greater data storage density and faster access speed in a disk storage system, head/disk assemblies are being designed with reduced track-to-track spacings to increase density and larger actuator driving forces to reduce access time. As a result, the driving forces coupled from one head actuator to another are that much more difficult to handle.

It has also been found that when a head actuator is to be driven an appreciable radial distance, the large driving force required to provide rapid access may cause a sufficiently large force to be coupled to another head actuator so as to displace its heads off their current track by an amount which cannot be compensated for by the servo control. Of course, it may be possible to redesign the mechanical structure of the head/disk assembly and/or the servo control circuitry to compensate to a certain degree. Still, the added expense resulting from such designs is considerable, particularly since redesign typically requires extensive testing and field experience to insure reliability. Moreover, the interaction between actuators still exists and, as described above, the trend in decreasing track pitch requires a solution that can more effectively control the accurate operation of multiple, independently controlled head actuators.

It can be seen that there is a need for a servo controller that counteracts the effects of another actuator by filtering the other actuator's acceleration.

It can also be seen that there is a need for a method and apparatus for providing feedforward control of two interacting actuators to compensate for interaction there between.

SUMMARY OF THE INVENTION

To overcome the limitations in the prior art described above, and to overcome other limitations that will become apparent upon reading and understanding the present specification, the present invention discloses a method and apparatus for providing feedforward control of two interacting actuators to compensate for interaction there between.

The present invention solves the above-described problems by providing state models for each actuator that processes acceleration for each actuator to provide an estimate of head acceleration for each of the actuators and to provide feedforward control signals to the actuators for controlling the positioning of the heads based upon the estimates of head acceleration for each of the actuators.

A system in accordance with the principles of the present invention includes at least one rotatable disk, at least first and second separately movable heads for providing transducing action with respect to the disk, first and second head actuators mounted so that the operation of one actuator causes mechanical forces to be coupled to the other actuator, said first actuator providing for radial movement of said first head relative to said disk and said second actuator providing for radial movement of said second head relative to said disk, the radial movement provided by each actuator being separately controllable from that of the other actuator and at least one controller, wherein the at least one controller comprises a first and second state model associated with the first and second actuators, wherein the first state model receives an acceleration applied to the second actuator and the second state model receives an acceleration applied to the first actuator, the first and second state models generating head acceleration estimates for the first and second actuators, and wherein the at least one controller produces control signals for the first and second actuators based upon the head acceleration estimates for the first and second actuators.

Other embodiments of a system in accordance with the principles of the invention may include alternative or optional additional aspects. One such aspect of the present invention is that the first and second state models produce head acceleration estimates for the first actuator by filtering the effect of the second actuator and wherein first and second state models produce head acceleration estimates for the second actuator by filtering the effect of the first actuator.

Another aspect of the present invention is that the at least one controller comprises a single controller, the single controller implementing both the first and second state models.

Another aspect of the present invention is that the at least one controller comprises a first and second controller, wherein the first controller implements the first state model for the first actuator and the second controller implements the second state model for the second actuator.

Another aspect of the present invention is that the system further includes a first and second register, wherein the first controller writes an acceleration for the first actuator in the first register and the second controller writes an acceleration for the second actuator in the second register, the first controller reading the second register and applying the acceleration stored in the second register to the first state model to produce the head acceleration estimates for the first and second actuators.

Another aspect of the present invention is that the second controller reads the first register and applying the acceleration stored in the first register to the second state model to produce the head acceleration estimates for the first and second actuators.

Another aspect of the present invention is that the at least one controller comprises a first and second controller, wherein the first controller implements the first and second state models for the first and second actuators.

Another aspect of the present invention is that the second state model implemented in the first controller receives from the second controller an acceleration applied to the second actuator, the first state model receiving from the first controller an acceleration applied to the first actuator, the first and second state models producing estimates of head acceleration for the first and second actuators, the second state model providing a feedforward control signal to the second controller that is used by the second controller to generating a control signal for the second actuator.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing feedforward control of two interacting actuators to compensate for interaction there between. The present invention provides state models for each actuator that process acceleration for each actuator to provide an estimate of head acceleration for each of the actuators and to provide feedforward control signals to the actuators for controlling the positioning of the heads based upon the estimates of head acceleration for each of the actuators.

Figure 1:
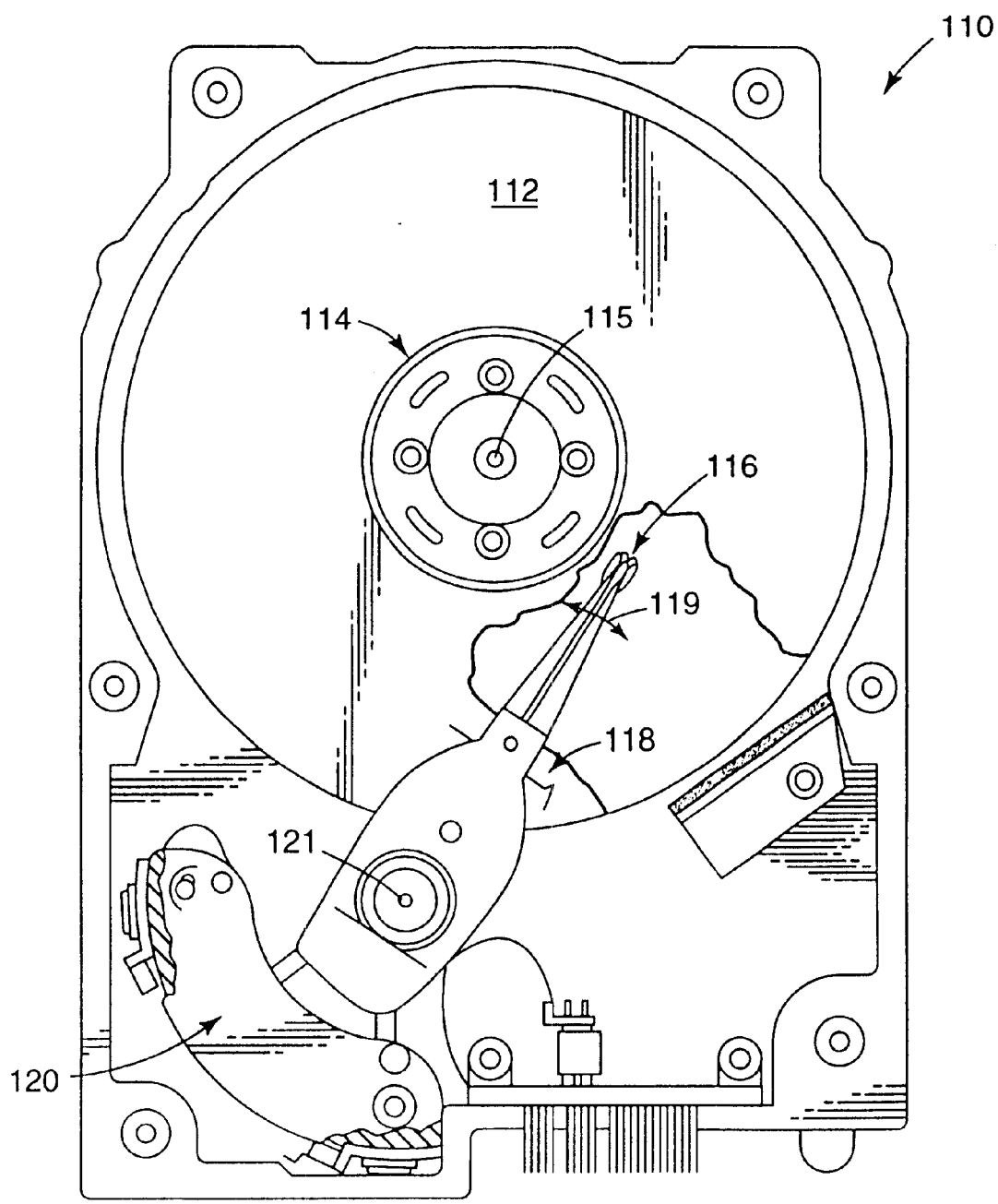
FIG. 1 is a plan view of a disk drive.

FIG. 1 is a plan view of a disk drive 100. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to at least one actuator assembly 118 in disk drive 100. An actuator assembly as shown in FIG. 1 is of the type known as a rotary moving coil actuator and includes a voice coil motor (VCM) shown generally at 120. A voice coil motor 120 rotates an actuator assembly 118 with its attached HGAs 116 about a pivot axis 121 to position HGAs 116 over desired data tracks on the associated disk surfaces, under the control of electronic circuitry housed within disk drive 100.

More specifically, an actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

Figure 2:
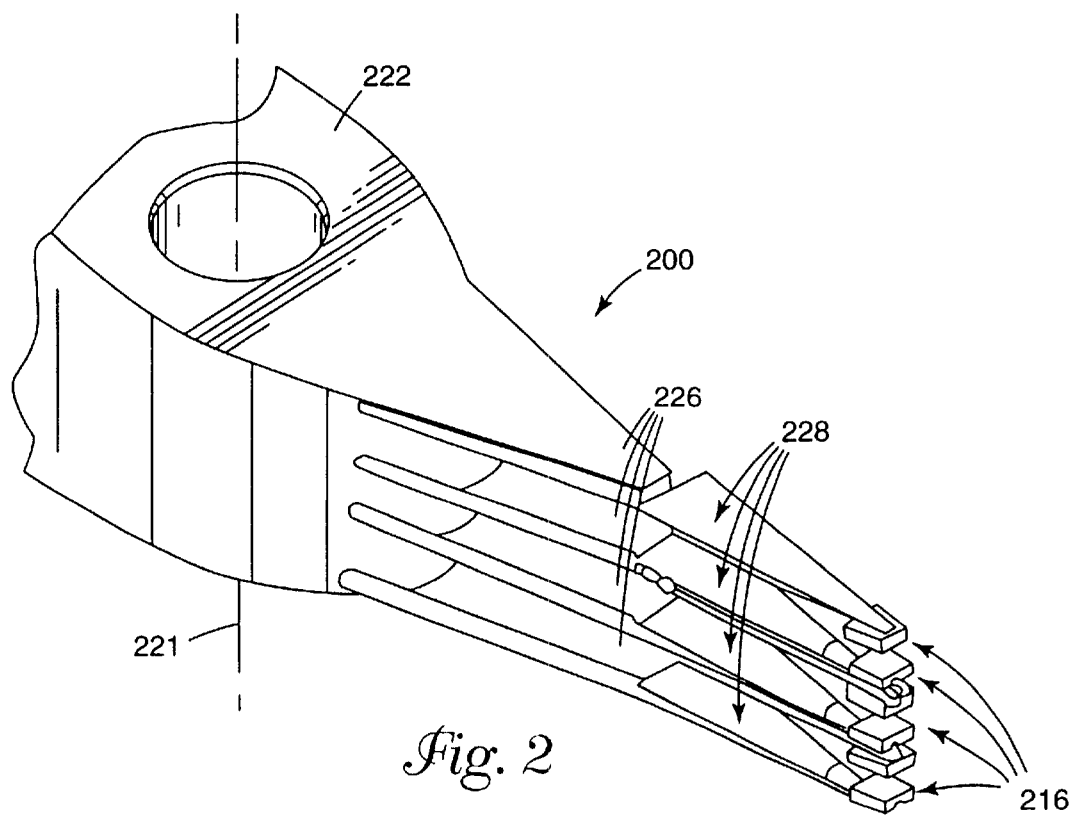
FIG. 2 is a perspective view of an actuator assembly.

FIG. 2 is a perspective view of an actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216. According to the present invention, multiple, independently controlled actuator assemblies 200 are provided in a disk drive.

Figure 3:
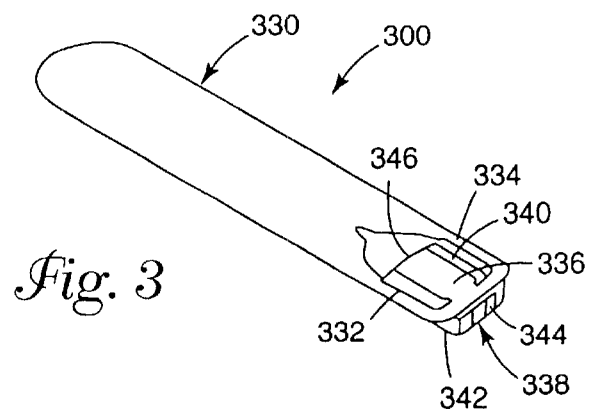
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342.

Transducers 344 are also preferably located on a leading edge of slider 338. The particular attachment between slider 338 and gimbal 330 is accomplished in any desired manner. For example, a compliant shear layer may be coupled between the upper surface 340 of slider 338 and a lower surface of gimbal bond tongue 336, with an adhesive. A compliant shear layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

Figure 4:
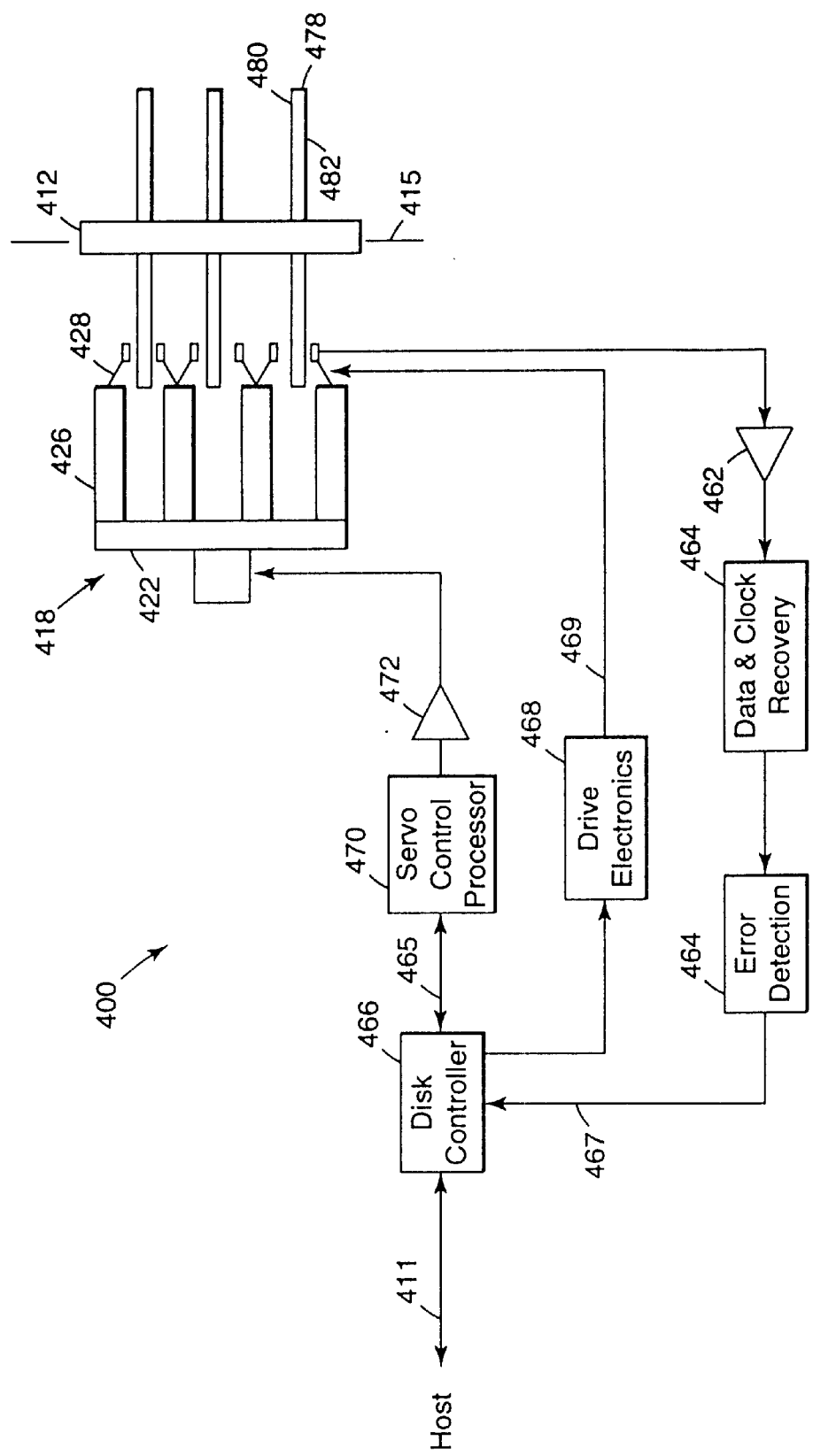
FIG. 4 is a block diagram of a portion of a disk drive that which illustrates a servo control processor.

FIG. 4 is a block diagram of a portion of a disk drive 400, which illustrates a servo control processor 470. In FIG. 4, the servo control processor 470 provides control signals to a single actuator. However, as will be described below, the present invention is directed to a disk drive having multiple, independently controlled head actuators. Therefore, those skilled in the art will recognize that the discussion of FIG. 4 may be expanded upon as further described with reference to FIGS. 5 and 6 below to include multiple servo control processors 470 (servo controllers) and multiple head actuators.

The portion of disk drive 400 which is illustrated in FIG. 4 includes actuator assembly 418, disk pack 412, preamplifier 460, data and clock recovery circuit 462, error detection circuit 464, drive controller 466, drive electronics 468, servo control processor 470 and power amplifier 472.

Drive controller 466 is preferably a microprocessor or digital computer, or other suitable microcontroller, and is coupled by bus 411 to a host system or another drive controller which controls the drive.

Disk pack 412 includes spindle 476 which supports a plurality of coaxially arranged disks 478. Each disk 478 is mounted for rotation with spindle 476 about axis of rotation 415. Each disk 478 has a first surface 480 and a second surface 482. Surfaces 480 and 482 include concentric tracks for receiving and storing data in the form of flux reversals encoded on the tracks.

Actuator assembly 418 includes base portion 422 supporting the plurality of actuator arms 426. Each of the actuator arms 426 is coupled to at least one of the load beams 428. Load beams 428, in turn, each support one of the head gimbal assemblies 416 (labeled in FIG. 3) above corresponding disk surfaces 480 or 482 for accessing data within the tracks on the disk surface.

In operation, drive controller 412 typically receives a command signal from a host system which indicates that a certain portion of one or more of disks 478 are to be accessed. In response to the command signal, drive controller 466 provides servo control processor 470 with a position (or reference) signal 465 which indicates a particular cylinder over which actuator assembly 418 is to position head gimbal assemblies 416. Servo control processor 470 converts the position signal into an analog signal which is amplified by power amplifier 472 and is provided to the voice coil motor in actuator assembly 418. In response to the analog position signal, actuator assembly 418 positions load beams 428 and their associated head gimbal assemblies 416 over a desired cylinder.

The head gimbal assemblies 416 generate a read signal containing data from embedded servo position data which is stored on a selected portion of each track of the disk to be read, as well as normal data to be accessed from the selected portion of the disk to be read. The read signal is provided to preamplifier 460 which amplifies the read signal and provides it to data and clock recovery circuit 462. Data and clock recovery circuit 462 recovers data from the read signal, which is encoded on the disk surface when the data is written to the disk surface, in a known manner. Of course, data and clock recovery circuit 462 can be a partial response maximum likelihood (PRML) channel, or another suitable type of read channel.

Once the data is recovered, it is provided to error detection circuit 464 which detects whether any errors have occurred in the data read back from the disk and which provides an output 467. Errors are corrected by error detection circuit 464 or drive controller 466, or a combination of both, in a known manner.

During head positioning, drive controller 466 provides a position signal to servo control processor 470 causing actuator assembly 418 to position head gimbal assemblies 416 over a selected cylinder. In a sector servo positioning drive (or an embedded servo positioning drive), a portion of each sector on the disk surfaces has position information which is encoded thereon and which is read by the data head and provided, through the read channel, to servo control processor 470. The positioning information not only gives coarse position information indicating the particular track over which the data head is flying, it also provides tuning feedback to the servo control processor for better positioning. Servo control processor 470 reacts to the position information read from the disk and positions the head gimbal assemblies 416 accordingly.

In order to write information to the disks, drive controller 466 receives not only the location of the information to be written on disk pack 412, but also receives the actual data to be written. The location information is provided to servo control processor 470 as a reference signal to coarsely position the data heads relative to the corresponding disk surfaces. Then, drive controller 466 provides the data to be written to data conditioning circuitry 468, which in turn provides that information at an output 469 to the particular transducers on the head gimbal assemblies 416 so that the data can be written to the disk surfaces, in a known manner.

The read channel provided in disk drive 400 (which in the embodiment shown in FIG. 4 includes preamp 460, data and clock recovery circuit 462 and error detection circuit 464) is capable of receiving a plurality of simultaneous and parallel data signals and processing those data signals in parallel, and providing them to the host system, and/or drive controller 466 in parallel. Further, drive electronics 468 is also preferably suitable for providing a plurality of simultaneous and parallel write signals to the data heads to execute a simultaneous and parallel write operation. Further, servo controller processor 470 is suitable for simultaneously providing positioning signals to actuator 418 to simultaneously align a plurality of heads with tracks on a plurality of disk surfaces in disk pack 412.

Figure 5:
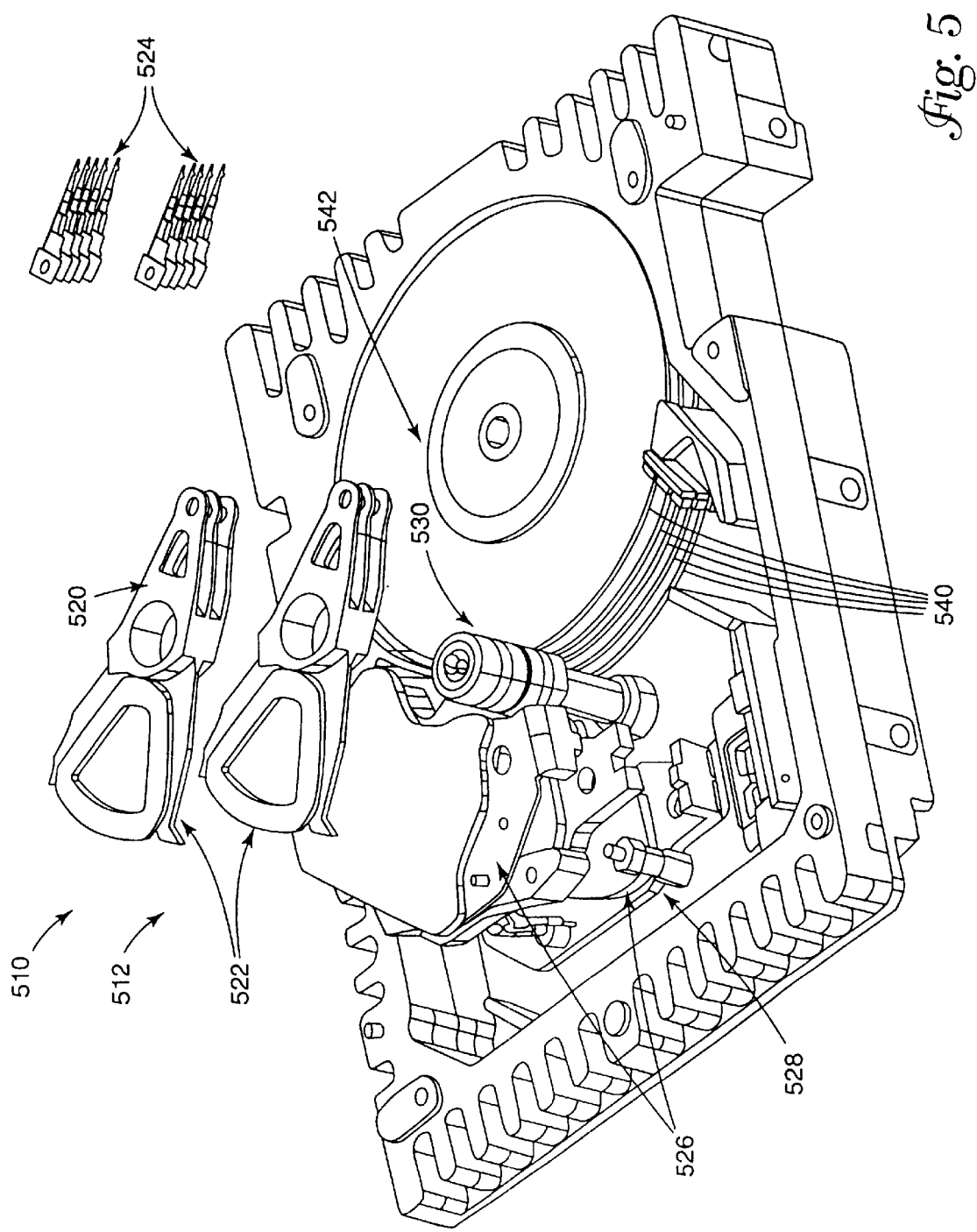
FIG. 5 illustrates a disk drive having two head actuators according to the present invention.

FIG. 5 illustrates a disk drive 500 having two head actuators 510, 512 according to the present invention. In FIG. 5, the head actuators 510, 512 include actuator combs 520, voice coil motor coils 522 and head gimbal assemblies (HGAs) 524. The head actuators 510, 512 are positioned by applying a control signal to the voice coil motor coils 522, which then move in response to the interaction with the dual magnets 526. A crash stop 528 is provided to limit the range of motion for the head actuators 510, 512. The head actuators 510, 512 are mounted about a pivot cartridge 530. The head actuators 510, 512 are moved relative to disks 540 in disk stack 542.

Figure 6:
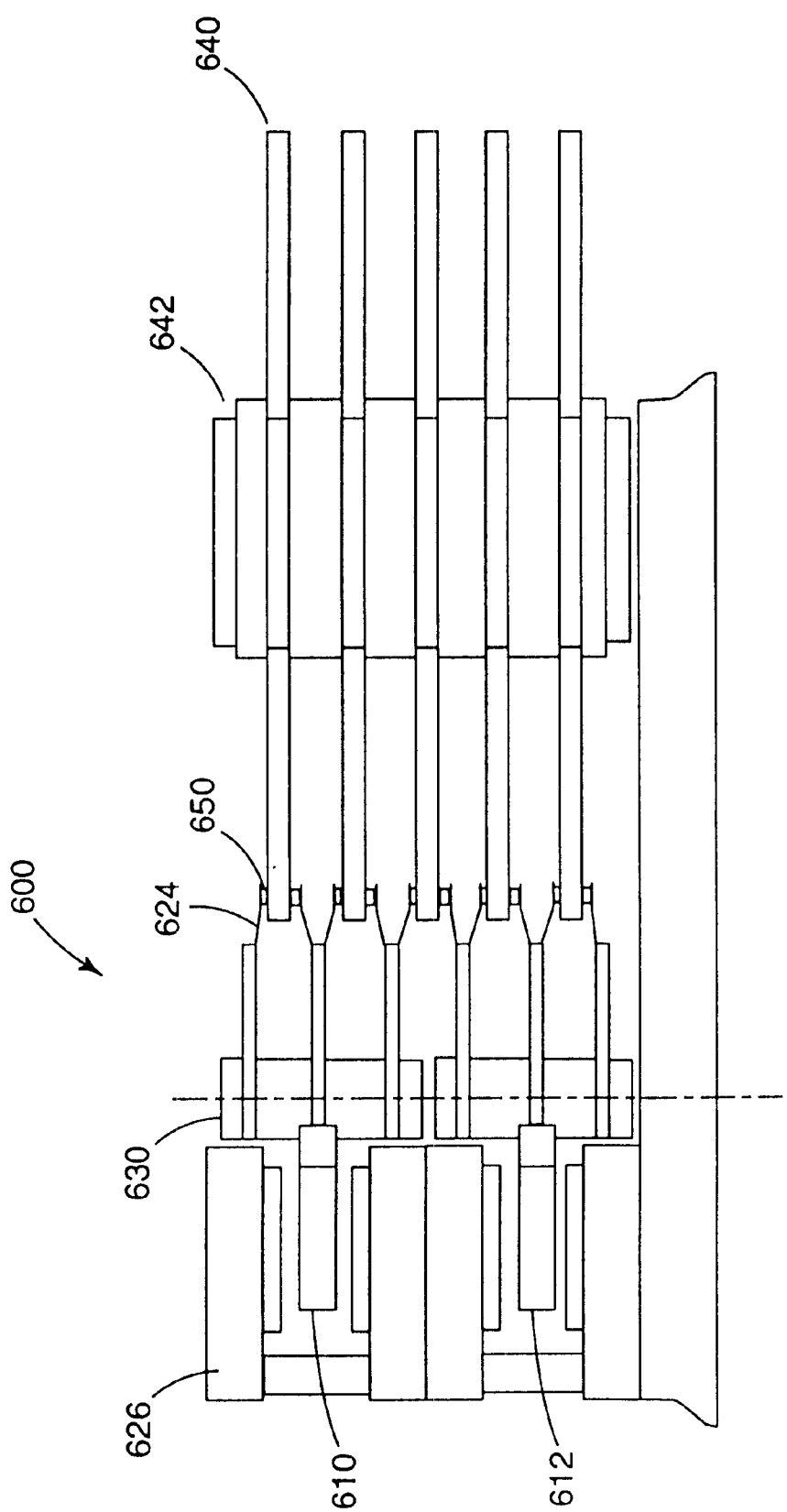
FIG. 6 illustrates a side view of the disk drive of FIG. 5.

FIG. 6 illustrates a side view 600 of the disk drive 500 of FIG. 5. FIG. 6 illustrates the head actuators 610, 612 positioned about the pivot cartridge 630 to cause the heads 650 on the head gimbal assemblies 624 to be moved relative to the surfaces of the disks 640 in the disk stack 642. FIG. 6 also demonstrates the magnets 626 relationship relative to the head actuators 610, 612.

Figure 7:
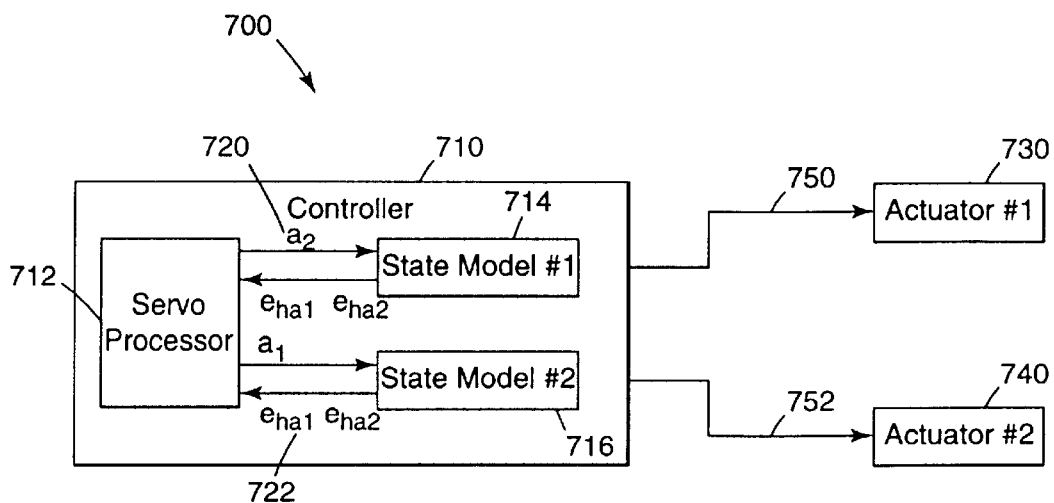
FIG. 7 illustrates a first embodiment of an actuator system according to the present invention.

FIG. 7 illustrates a first embodiment of an actuator system 700 according to the present invention. In FIG. 7, a single controller 710 includes state model 714, 716 for each actuator. In FIG. 7, two state models 714, 716 are provided for two actuators 730, 740. However, those skilled in the art will readily recognize the present invention is not meant to be limited to two state models and two actuators. Rather, according to the present invention any number of multiple, independently controlled actuators with corresponding state models may be implemented. FIG. 7 represents the embodiment, however, wherein a single controller 710 implements each of the multiple state models 714, 716.

Unlike the classic case of exogenous disturbances where the controller 710 has no a priori knowledge of the disturbances, the force being applied by the seeking actuator 730, 740 is known. Therefore, the knowledge of the acceleration forces 720 may be used to predict the interaction on a second actuator using rigid body models 714, 716 held within the controller. In FIG. 7, the controller 710 has an augmented state model 714, 716 for each actuator 730, 740. A servo processor 712 for the controller 710 operates with the state models 714, 716 to provide control signals 750, 752 to both actuators 730, 740. The input to each model 714, 716 is the acceleration 720 of the other actuator. The two outputs of that models 714, 716 are the estimates of head acceleration 722 due to the seek, one for each actuator 730, 740. Thus, the state models 714, 716 provide an estimate of head acceleration for each of the actuators so that the controller 710 can generate control signals 750, 752 to the actuators 730, 740 for controlling the positioning of the heads based upon the estimates of head acceleration 720 for each of the actuators 730, 740.

Figure 8:
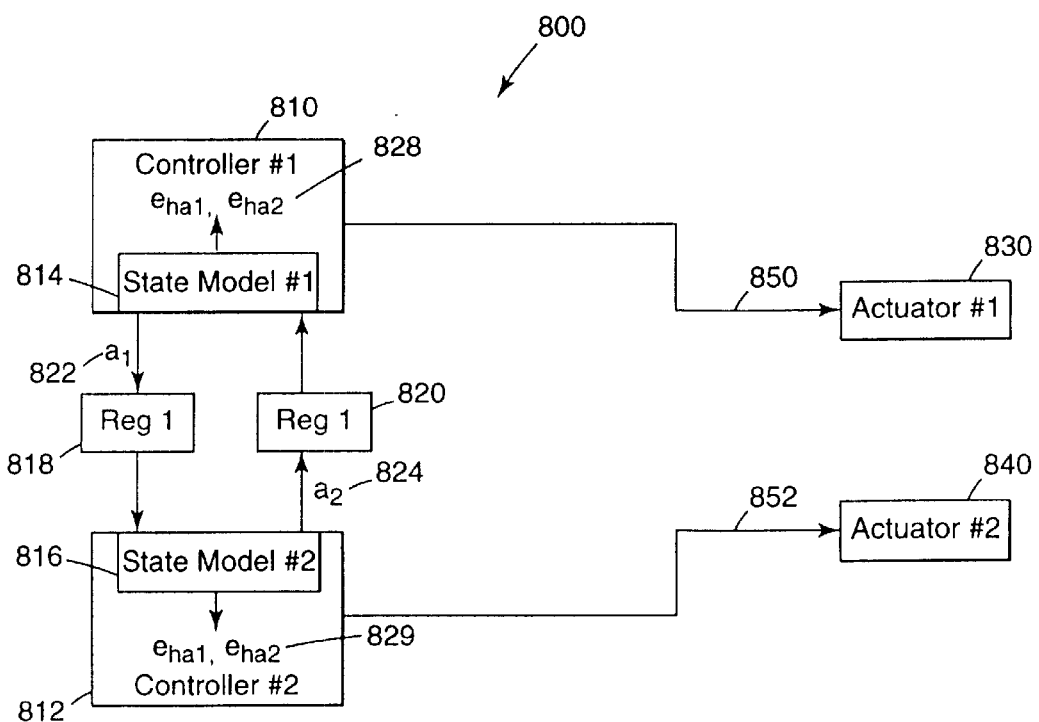
FIG. 8 illustrates a second embodiment of an actuator system according to the present invention.

FIG. 8 illustrates a second embodiment of an actuator system 800 according to the present invention. In FIG. 8, a servo controller 810, 812 is provided for each actuator 830, 840. Each of the servo controllers 810, 812 include a state model 814, 816 for each actuator 830, 840. The input to each model 814, 816 is the acceleration of the other actuator 822, 824. The two outputs of the model 814, 8116 are the estimates of head acceleration 828, 829 due to the seek, one for each actuator 830, 840. Thus, the state models 814, 816 provide an estimate of head acceleration for each of the actuators so that the controller 810, 812 can generate control signals 850, 852 to the actuators 830, 840 for controlling the positioning of the heads based upon the estimates of head acceleration for each of the actuators.

Further, in FIG. 8, a handshaking arrangement is arranged to communicate the acceleration of the actuators from one controller to another. As described above, each controller 810, 812 has an augmented state model 814, 816. Those skilled in the art will recognize that the handshaking may be implemented in a variety of ways. However, FIG. 8 illustrates a pair of registers 818, 820. Controller 1 810 writes the value of the acceleration applied to actuator 1 822 in register 1 818, and controller 2 812 writes the value of acceleration applied to actuator 2 824 in register 2 820. Controller 1 810 reads register 2 820 and applies that value to its augmented state model 814, and incorporates the output of that model in its calculation of the control 850 for actuator 1 830. Controller 2 812 likewise reads register 1 818 and applies that value to its augmented state model 816.

Figure 9:
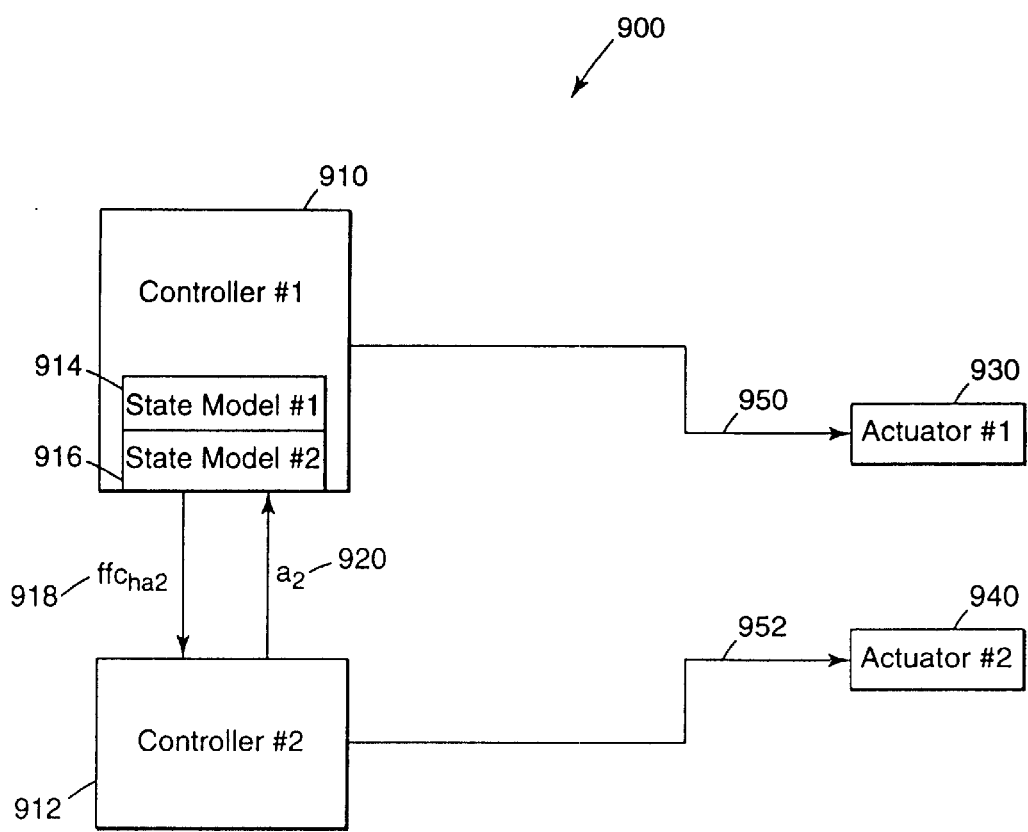
FIG. 9 illustrates a third embodiment of an actuator system according to the present invention.

FIG. 9 illustrates a third embodiment of an actuator system 900 according to the present invention. In FIG. 9, a servo controller 910, 912 is provided for each actuator 930, 940. However, in FIG. 9, one of the servo controllers, e.g., controller 1 910 as shown in FIG. 9, implements both of the state models 914, 916. Thus, controller 2 912 provides the acceleration 920 associated with actuator 2 940 to the state models 914, 916 of controller 1 910. The input to each model is still the acceleration of the other actuator. The two outputs of the model are the estimates of head acceleration due to the seek, one for each actuator. Thus, the state models 914, 916 provide an estimate of head acceleration for each of the actuators so that controller 1 910 can generate a feedforward control signal 918 to the second controller 912 to drive actuator 2 940 for controlling the positioning of the heads based upon the estimates of head acceleration for each of the actuators. Controller 1 910 also generates a control signal 950 to the first actuator 930 to drive actuator 1 930 for controlling the positioning of the heads based upon the estimates of head acceleration for each of the actuators.

If actuator 1 930 is track following, controller 2 912 need not account for the applied acceleration, since in this case it is negligible. Also, if actuator 1 930 is seeking, it may not care about the acceleration 920 applied to actuator 2 940 during seek because the positions are not closely regulated. However, the augmented models 914, 916 should still be updated, as the effects of the acceleration may matter for several milliseconds after the acceleration has ended.

Also important to success is proper calibration of the models. This can take one of two forms. The models 914, 916 can be continuously updated during the operation of the file, or it can be calibrated during an off-line recalibration process. The advantage of the off-line process is that the models 914, 916 can be tuned until an acceptable level of cancellation is reached; but with the adaptive model, no interruption of the drives workload need take place.

With the finer track pitches, shock mounts may be required. Thus, the controller will already be using an augmented state model to account for these effects. Also an option is isolating the VCM magnets to reduce the effects of the counter-torque applied on them.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive, comprising:
   at least one rotatable disk;
   at least first and second separately movable heads for providing transducing action with respect to the disk;
   first and second head actuators mounted so that the operation of one actuator causes mechanical forces to be coupled to the other actuator, said first actuator providing for radial movement of said first head relative to said disk and said second actuator providing for radial movement of said second head relative to said disk, the radial movement provided by each actuator being separately controllable from that of the other actuator; and
   at least one controller, wherein the at least one controller comprises a first and second state model associated with the first and second actuators, wherein the first state model receives an acceleration applied to the second actuator and the second state model receives an acceleration applied to the first actuator, the first and second state models generating head acceleration estimates for the first and second actuators, and wherein the at least one controller produces control signals for the first and second actuators based upon the head acceleration estimates for the first and second actuators.

2. The disk drive of claim 1 wherein the first and second state models produce head acceleration estimates for the first actuator by filtering the effect of the second actuator and wherein first and second state models produce head acceleration estimates for the second actuator by filtering the effect of the first actuator.

3. The disk drive of claim 1 wherein the at least one controller comprises a single controller, the single controller implementing both the first and second state models.

4. The disk drive of claim 1 wherein the at least one controller comprises a first and second controller, wherein the first controller implements the first state model for the first actuator and the second controller implements the second state model for the second actuator.

5. The disk drive of claim 4 further comprising a first and second register, wherein the first controller writes an acceleration for the first actuator in the first register and the second controller writes an acceleration for the second actuator in the second register, the first controller reading the second register and applying the acceleration stored in the second register to the first state model to produce the head acceleration estimates for the first and second actuators.

6. The disk drive of claim 5 wherein the second controller reads the first register and applying the acceleration stored in the first register to the second state model to produce the head acceleration estimates for the first and second actuators.

7. The disk drive of claim 1 wherein the at least one controller comprises a first and second controller, wherein the first controller implements the first and second state models for the first and second actuators.

8. The disk of claim 7 wherein the second state model implemented in the first controller receives from the second controller an acceleration applied to the second actuator, the first state model receiving from the first controller an acceleration applied to the first actuator, the first and second state models producing estimates of head acceleration for the first and second actuators, the second state model providing a feedforward control signal to the second controller that is used by the second controller to generating a control signal for the second actuator.

9. A method for providing feedforward control of two interacting actuators to compensate for interaction therebetween, comprising:
   providing at least one rotatable disk,
   providing at least first and second separately movable heads for transducing with respect to the disk;
   radially moving a first head associated with a first head actuator and radially moving a second first head associated with a second head actuator; wherein the radial movement provided by each actuator being separately controllable from that of the other actuator;
   providing a first and second state model associated with the first and second actuators
   receiving at the first state model an acceleration applied to the second actuator and receiving at the second state model an acceleration applied to the first actuator
   generating by the first and second state models head acceleration estimates for the first and second actuators based upon the acceleration applied to the second actuator received by the first state model and the acceleration applied to the first actuator received by the second state model; and
   producing control signals for the first and second actuators based upon the head acceleration estimates for the first and second actuators.

10. The method of claim 9 wherein the first and second state models produce head acceleration estimates for the first actuator by filtering the effect of the second actuator and wherein first and second state models produce head acceleration estimates for the second actuator by filtering the effect of the first actuator.

11. The method of claim 9 wherein the first and second state models are implemented in a single controller.

12. The method of claim 9 wherein a first controller implements the first state model for the first actuator and a second controller implements the second state model for the second actuator.

13. The method of claim 12 further comprising writing from the first controller an acceleration for the first actuator in a first register and writing from the second controller an acceleration for the second actuator in a second register.

14. The method of claim 13 further comprising reading the second register with the first controller and applying the acceleration stored in the second register to the first state model to produce the head acceleration estimates for the first and second actuators.

15. The method of claim 14 further comprising reading the first register with the second controller and applying the acceleration stored in the first register to the second state model to produce the head acceleration estimates for the first and second actuators.

16. The method of claim 9 wherein the first and second state models are implemented in a first controller, and wherein the second state model implemented in the first controller receives from a second controller an acceleration applied to the second actuator, the first state model receiving from the first controller an acceleration applied to the first actuator, the first and second state models producing estimates of head acceleration for the first and second actuators, the second state model providing a feedforward control signal to the second controller that is used by the second controller to generating a control signal for the second actuator.

* * * * *